(12) United States Patent (10) Patent No.: US 7,593,966 B2
Therrien et al. (45) Date of Patent: Sep. 22, 2009

(54) METHOD AND APPARATUS FOR SERVER SHARE MIGRATION AND SERVER RECOVERY USING HIERARCHICAL STORAGE MANAGEMENT

(75) Inventors: David G. Therrien, Nashua, NH (US);
James E. Pownell, Natick, MA (US);
Adrian VanderSpek, Worcester, MA (US); Herman Robert Kenna, Harvard, MA (US); Thomas G. Hansen, Bellingham, MA (US); Sean R. Gilhooly, Framingham, MA (US);
Steven H. Evilia, Westboro, MA (US)

(73) Assignee: Exagrid Systems, Inc., Westboro, MA (US)

( * ) Notice: Subject to any disclaimer, the term of this patent is extended or adjusted under 35 U.S.C. 154(b) by 371 days.

(21) Appl. No.: 10/659,642

(22) Filed: Sep. 10, 2003

(65) Prior Publication Data

US 2004/0088382 A1 May 6, 2004

Related U.S. Application Data

(60) Provisional application No. 60/409,684, filed on Sep. 10, 2002.

(51) Int. Cl.
*G06F 12/00* (2006.01)
*G06F 17/30* (2006.01)
(52) U.S. Cl. .................... 707/200; 707/202; 707/102
(58) Field of Classification Search .............. 707/200, 707/3
See application file for complete search history.

(56) References Cited

U.S. PATENT DOCUMENTS 5,155,845 A 10/1992 Beal et al. ................... 395/575

5,276,867 A * 1/1994 Kenley et al. ............... 707/204

(Continued)

FOREIGN PATENT DOCUMENTS

EP 0 520 459 A2 12/1992

(Continued)

OTHER PUBLICATIONS

Garcia-Molina, et al., 35th IEEE Computer Society International Conference, pp. 573-577 (1990).

(Continued)

*Primary Examiner*—John R. Cottingham
*Assistant Examiner*—Michael Pham
(74) *Attorney, Agent, or Firm*—Mintz, Levin, Cohn, Ferris, Glovsky and Popeo PC

(57) ABSTRACT

The present invention provides systems and methods for transferring a set of files. Metadata and stub files associated with the set of files are received at a destination fileserver, a location component in the destination fileserver is updated to maintain a list of repository nodes associated with each file in the set of files, and each stub file is replaced with the full content of the file associated with the stub file. The replacing includes receiving a client request for a specified file in the set of files and replacing the stub file associated with the specified file with a full content of the specified file if the full content of the specified file has not yet been transferred. Replacing the stub file associated with a requested file is a higher priority task than replacing a stub file associated with a non-requested file.

19 Claims, 8 Drawing Sheets

U.S. PATENT DOCUMENTS

| | | | |
|---|---|---|---|
| 5,379,418 A | 1/1995 | Shimazaki et al. | 395/575 |
| 5,537,585 A * | 7/1996 | Blickenstaff et al. | 707/205 |
| 5,544,347 A | 8/1996 | Yanai et al. | 395/489 |
| 5,564,037 A * | 10/1996 | Lam | 711/161 |
| 5,633,999 A | 5/1997 | Clowes et al. | 395/182.04 |
| 5,764,972 A | 6/1998 | Crouse et al. | 395/601 |
| 5,778,395 A | 7/1998 | Whiting et al. | 707/204 |
| 5,852,713 A | 12/1998 | Shannon | 395/182.04 |
| 5,857,112 A | 1/1999 | Hashemi et al. | 395/828 |
| 5,893,919 A | 4/1999 | Sarkozy et al. | 711/114 |
| 5,960,169 A | 9/1999 | Styczinski | 395/182.04 |
| 5,966,730 A | 10/1999 | Zulch | 711/162 |
| 5,991,753 A * | 11/1999 | Wilde | 707/2 |
| 6,023,709 A | 2/2000 | Anglin et al. | 707/204 |
| 6,073,209 A | 6/2000 | Bergsten | 711/114 |
| 6,088,694 A | 7/2000 | Burns et al. | 707/8 |
| 6,163,856 A | 12/2000 | Dion et al. | 714/4 |
| 6,269,424 B1 | 7/2001 | Katsuragi et al. | 711/114 |
| 6,330,572 B1 | 12/2001 | Sitka | 707/205 |
| 6,393,516 B2 | 5/2002 | Johnson | 711/111 |
| 6,446,175 B1 | 9/2002 | West et al. | 711/162 |
| 6,453,339 B1 | 9/2002 | Schultz et al. | 709/206 |
| 6,490,666 B1 * | 12/2002 | Cabrera et al. | 711/161 |
| 6,546,404 B1 | 4/2003 | Davis et al. | 707/204 |
| 6,587,217 B1 * | 7/2003 | Lahey et al. | 358/1.15 |
| 6,643,795 B1 | 11/2003 | Sicola et al. | 714/6 |
| 2002/0055972 A1 * | 5/2002 | Weinman, Jr. | 709/203 |
| 2002/0059539 A1 | 5/2002 | Anderson | 714/6 |
| 2002/0069280 A1 * | 6/2002 | Bolik et al. | 709/225 |
| 2002/0107877 A1 | 8/2002 | Whiting et al. | 707/204 |
| 2002/0111929 A1 * | 8/2002 | Pudipeddi et al. | 707/1 |
| 2003/0046270 A1 * | 3/2003 | Leung et al. | 707/1 |
| 2003/0078946 A1 * | 4/2003 | Costello et al. | 707/201 |
| 2004/0049513 A1 * | 3/2004 | Yakir et al. | 707/100 |
| 2004/0054656 A1 * | 3/2004 | Leung et al. | 707/1 |
| 2004/0083202 A1 * | 4/2004 | Mu et al. | 707/3 |
| 2004/0088331 A1 * | 5/2004 | Therrien et al. | 707/200 |
| 2004/0093361 A1 * | 5/2004 | Therrien et al. | 707/204 |
| 2004/0093555 A1 * | 5/2004 | Therrien et al. | 714/805 |
| 2005/0021566 A1 * | 1/2005 | Mu | 707/200 |

OTHER PUBLICATIONS

Lyon, J., 35$^{th}$ IEEE Computer Society International Conference, pp. 562-567 (1990).

Mohan, et al., Proceedings of the 9$^{th}$ International Conference on Data Engineering, pp. 511-518 (1993).

European Search Report dated Jan. 31, 2008.

* cited by examiner

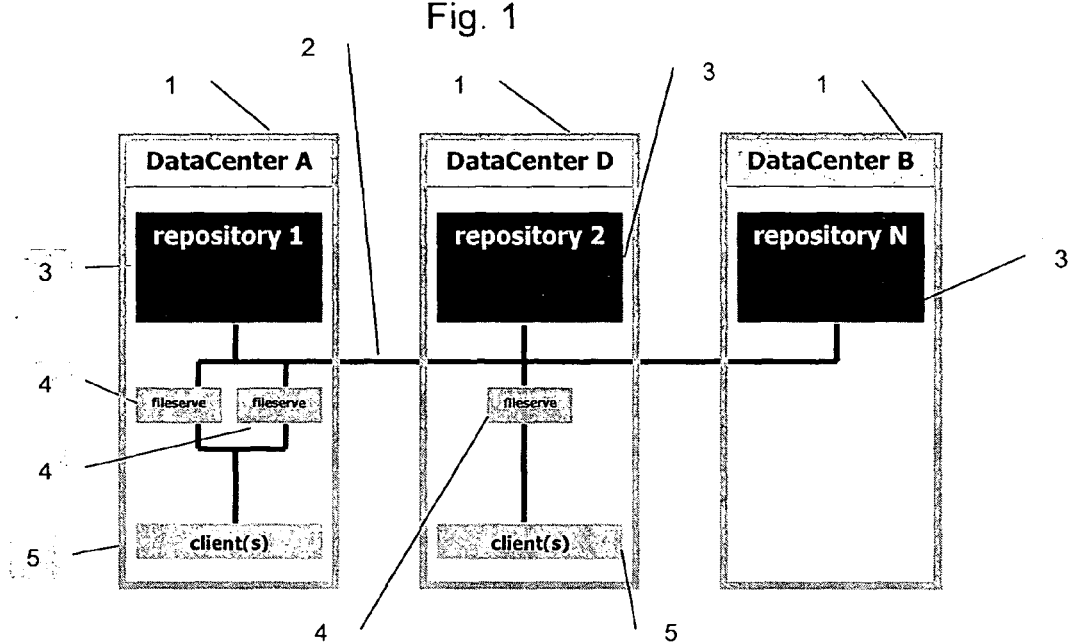
Figure 1: Sample Protected Storage Grid deployment
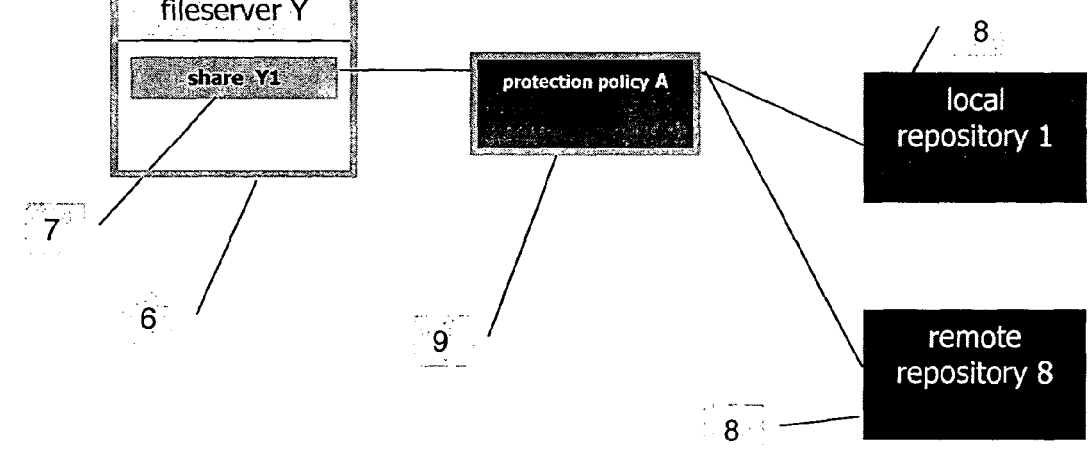
Figure 2: protection policy

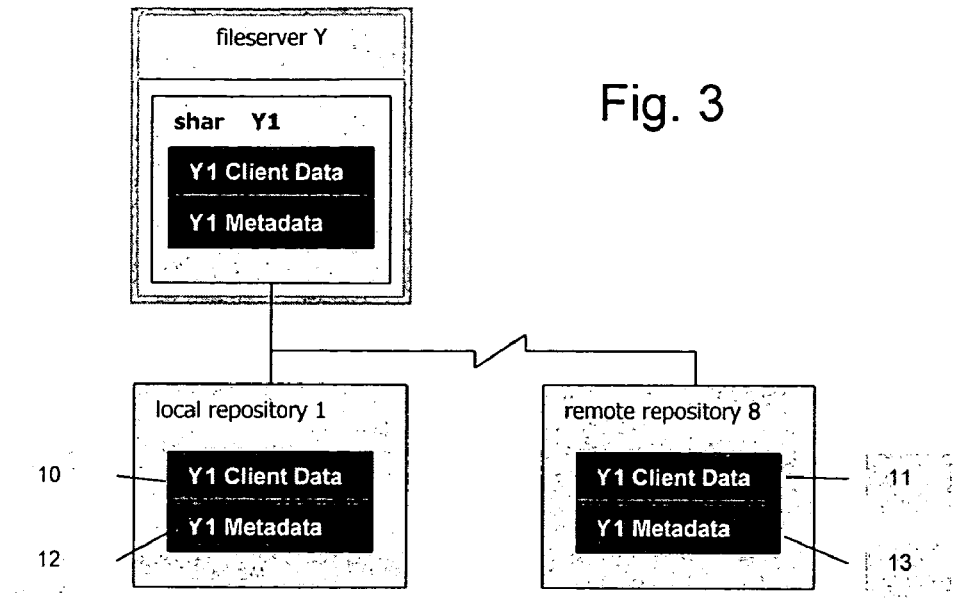
Figure 3: Fileserver Recovery - Before Recovery
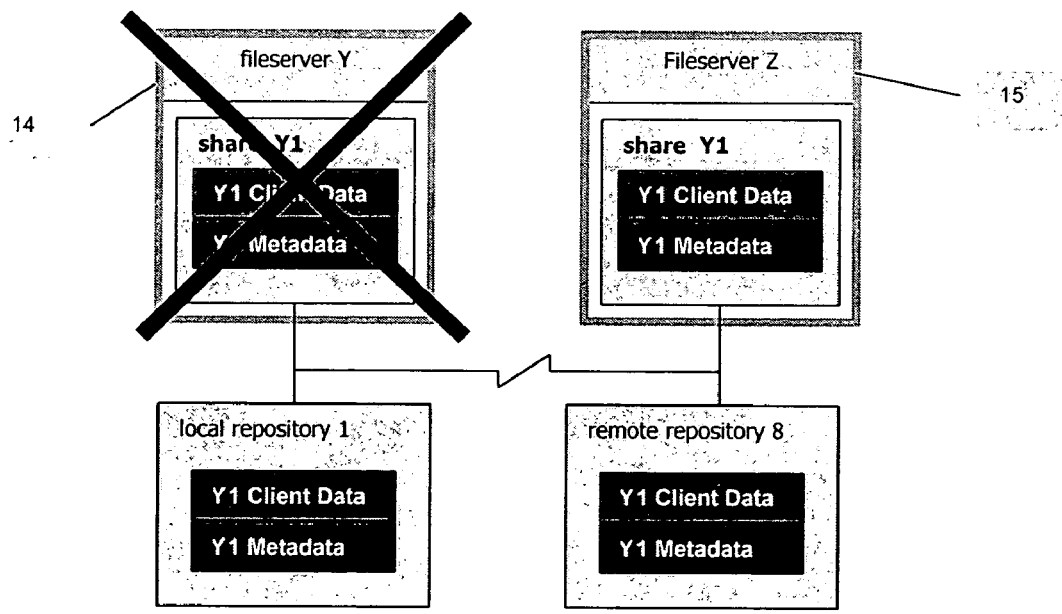
Figure 4: Fileserver Recovery - After Recovery

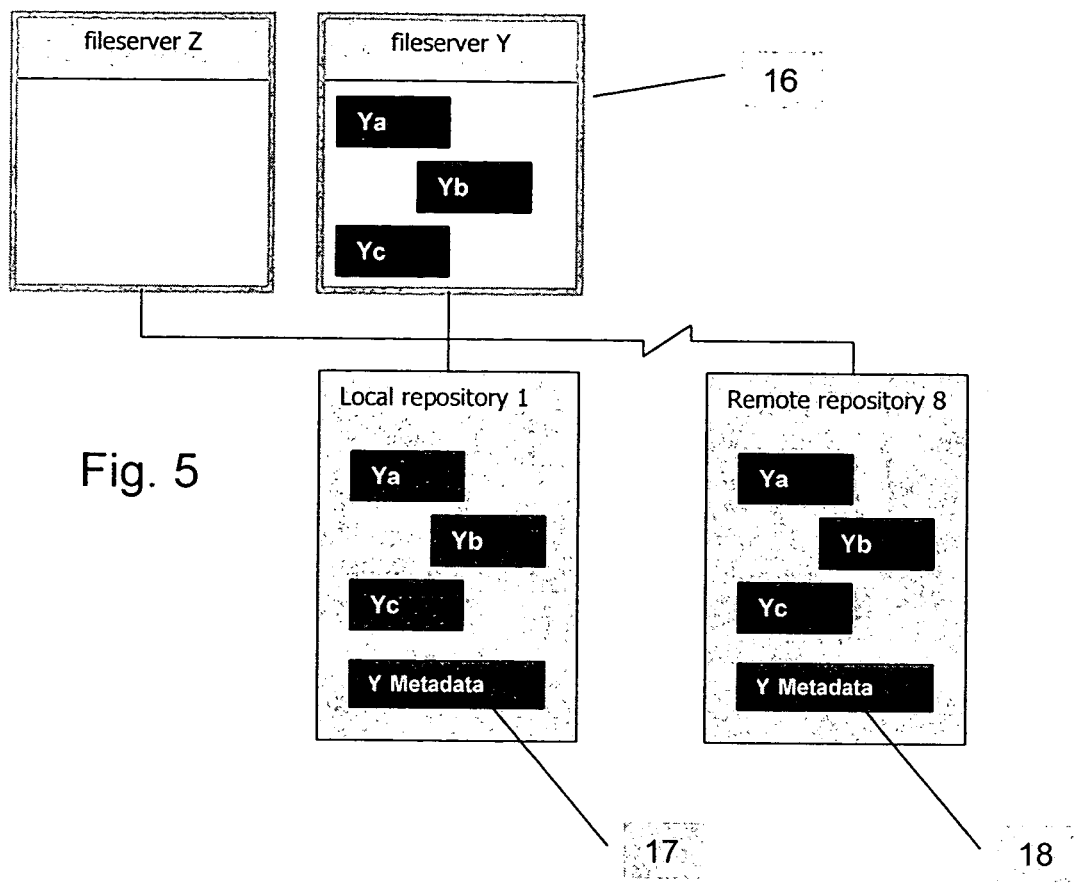
Figure 5: Share Migration - before Migration

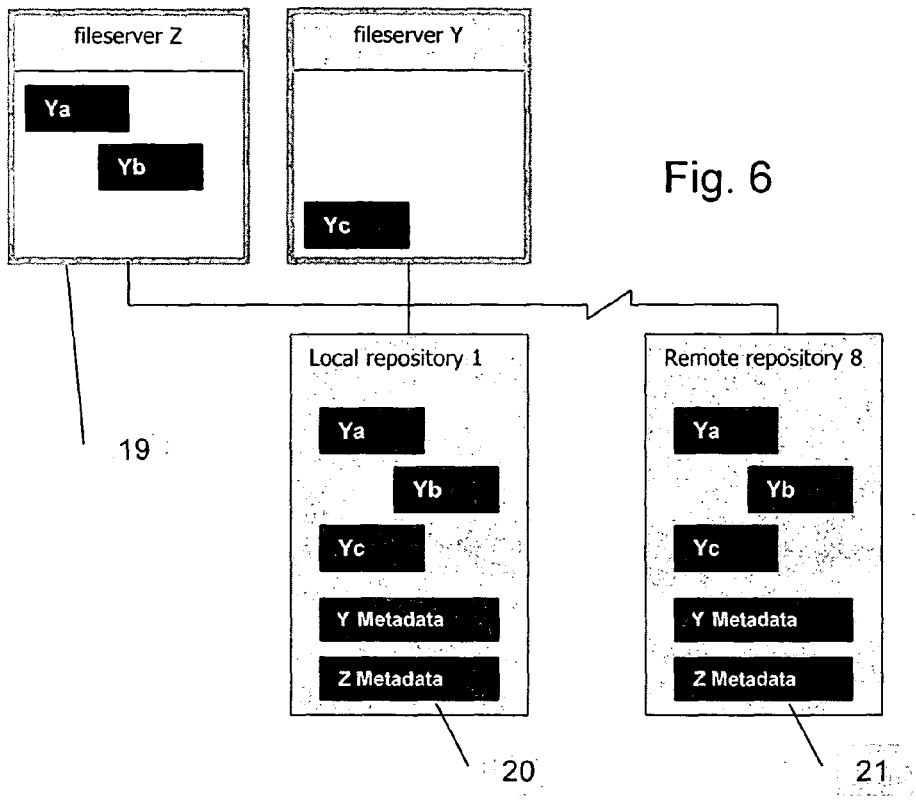
Figure 6: Share Migration - after Migration
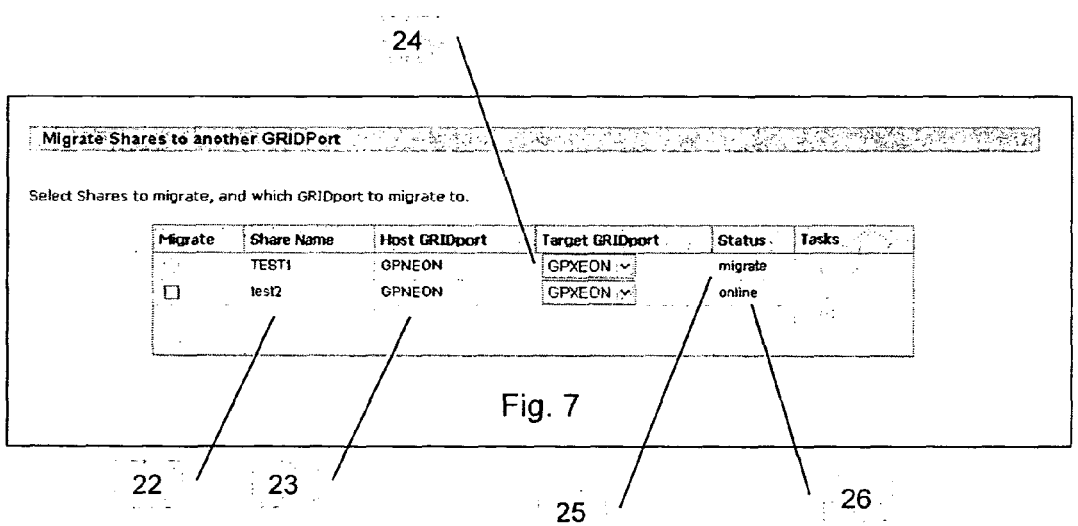
Figure 7: User Interface for share migration

Fig. 8

Fig 8. The present invention's protection policy

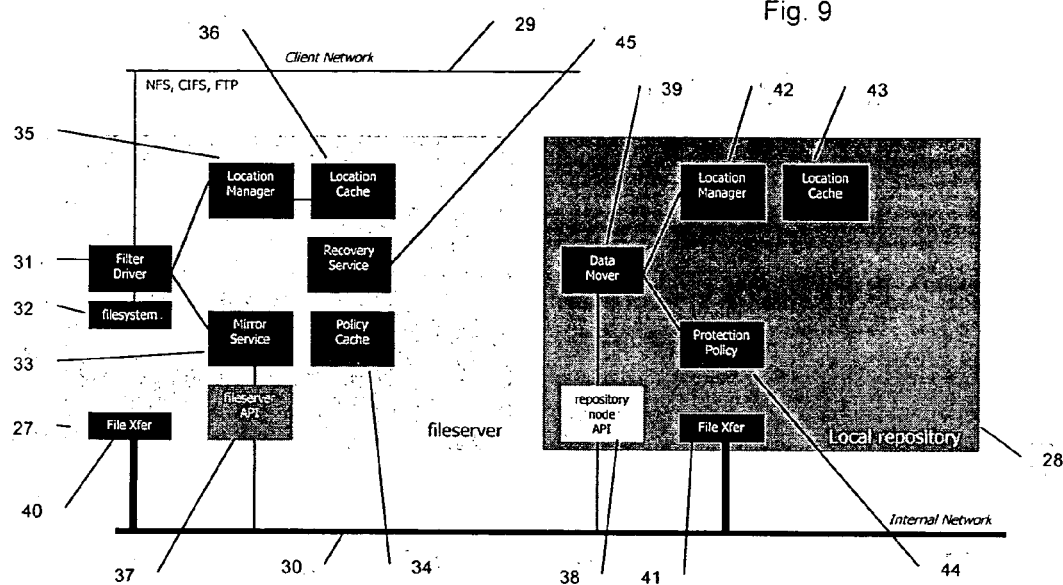
Fig 9. Apparatus and modules used to protect data to a local repository
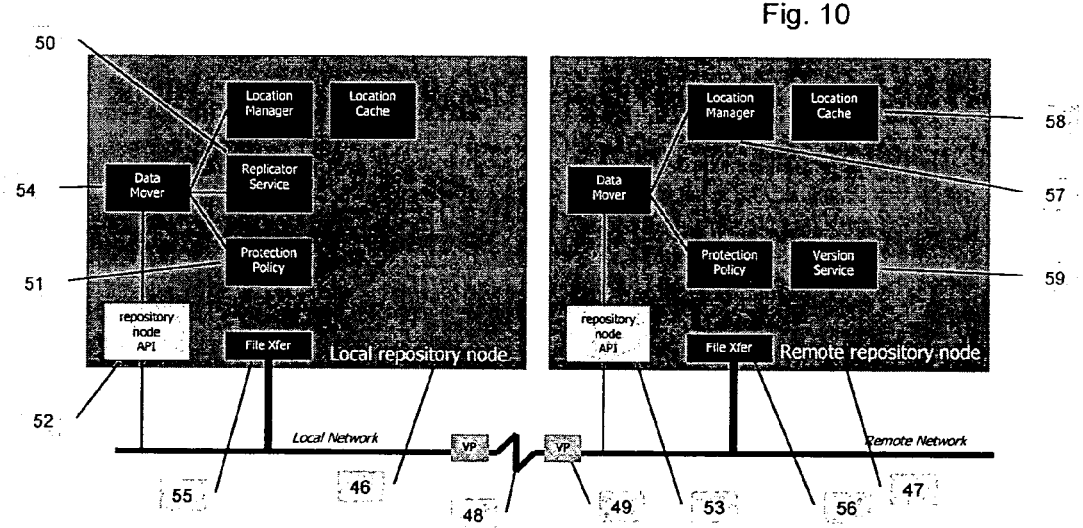
Fig 10. Inter-repository replication

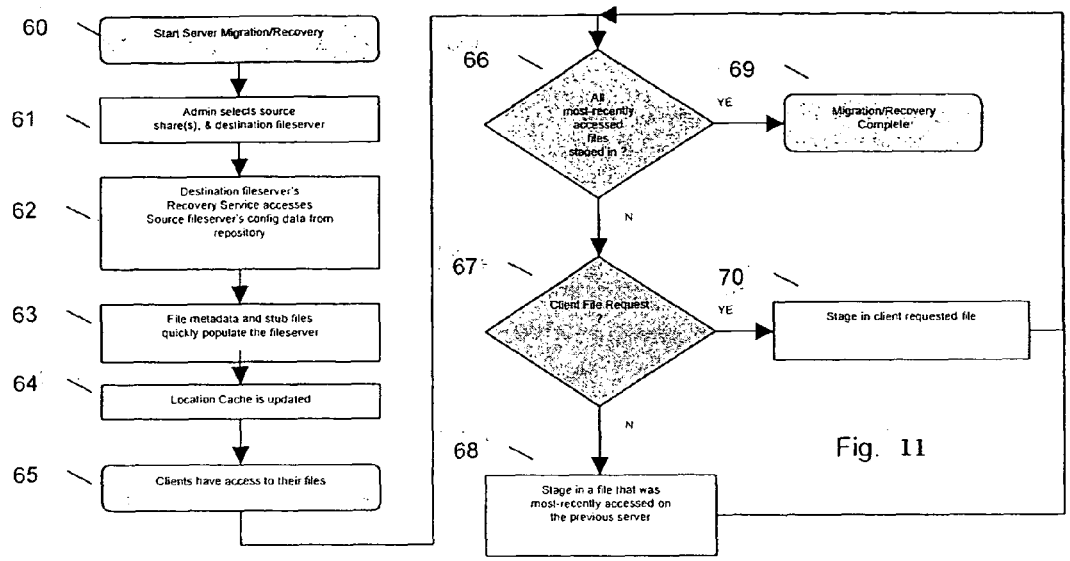
Figure 11: Two-stage Share Migration/Recovery Procedure
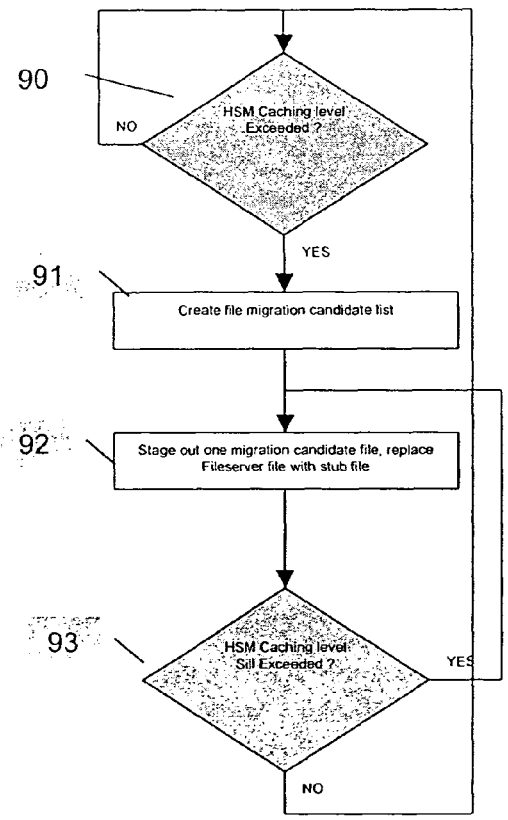
Fig. 12
Figure 12: Fileserver Caching and Stage-out Process

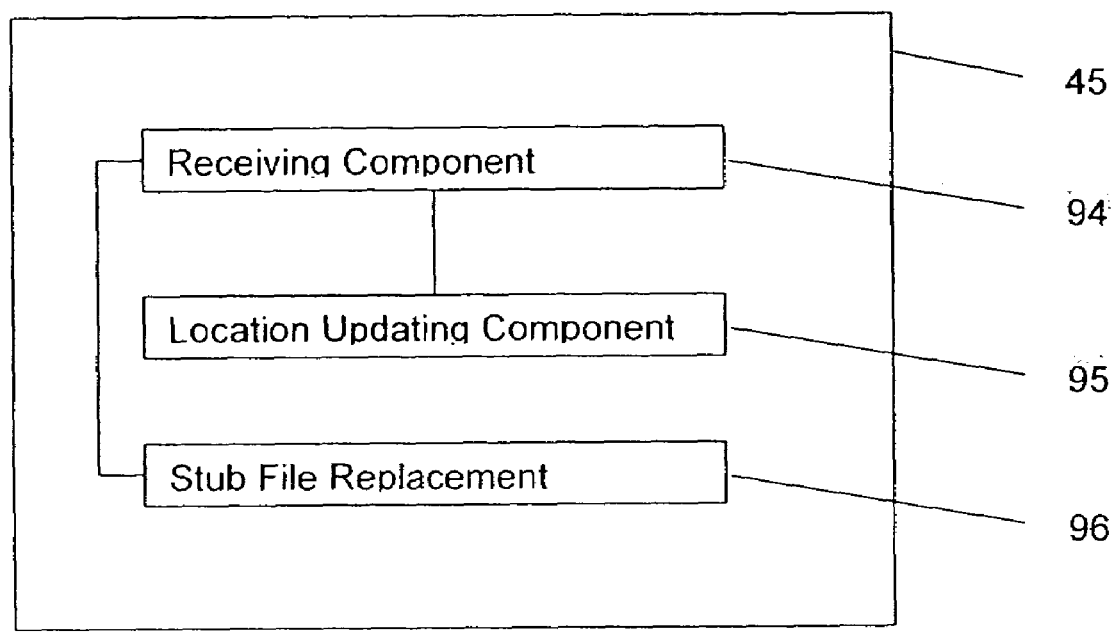
Figure 13: Recovery Service schematic

METHOD AND APPARATUS FOR SERVER SHARE MIGRATION AND SERVER RECOVERY USING HIERARCHICAL STORAGE MANAGEMENT

CROSS-REFERENCE TO RELATED APPLICATIONS

This application claims priority to, and the benefit of, U.S. Provisional Application Ser. No. 60/409,684 filed, Sep. 10, 2002, entitled "System and Method for Consolidated Storage and Data Protection," and incorporated herein by reference in its entirety.

This application is also related to: U.S. patent application Ser. No. 10/659,129 filed Sep. 10, 2003, entitled, "METHOD AND APPARATUS FOR INTEGRATING PRIMARY DATA STORAGE WITH LOCAL AND REMOTE DATA PROTECTION" U.S. patent application Ser. No. 10/658,978 filed Sep. 10, 2003, entitled "METHOD AND APPARATUS FOR TWO-LEVEL STORAGE SYSTEM TO PROVIDE SECURE, SHARED AND SCALABLE DISTRIBUTED DATA STORAGE AND PROTECTION;" and U.S. patent application Ser. No. 10/659,128 filed Sep. 10, 2003, entitled "METHOD AND APPARATUS FOR MANAGING DATA INTEGRITY OF BACKUP AND DISASTER RECOVERY DATA" each of which is incorporated herein by reference in its entirety.

BACKGROUND OF THE INVENTION

The present invention is related to computer primary data storage systems and methods that provide comprehensive data protection. As background to the invention, hierarchical storage management (HSM) is a data management technique that is deployed with multiple types of data storage technologies like magnetic disk drives, magnetic tape drives, and optical disk drives. HSM has been used to transparently move the contents of files that are least recently accessed by client applications from higher speed, higher cost magnetic disk technology to lower cost, lower speed media like magnetic tape and optical disk.

These various storage technologies can be arranged in a multi-level hierarchy from fastest to slowest and/or from most costly to least costly. For the following example, assume that magnetic disks are employed as the fast, more costly primary storage device and magnetic tape is employed as the lower cost, slower access storage technology within an HSM hierarchy. With HSM in operation, the files that are most-recently accessed by client applications are retained in their complete form on magnetic disk and least recently accessed files are migrated out to magnetic tape. HSM software enables client applications to transparently access files that have been migrated out to magnetic tape. When a file that is least-recently used has been migrated out to magnetic tape, a much smaller stub file remains on magnetic disk, typically 1 KB to 4 KB in size. This stub file contains all of the basic operating system file information as well as an indication that this file has been migrated from the magnetic disk to another medium. The stub file also includes information that HSM uses to acquire the entire contents of a file from a magnetic tape and restore the complete content of a file to magnetic disk transparently when it has been requested by a client application.

Thus, HSM can be an effective way to manage large amounts of infrequently accessed data in a cost effective manner. HSM is also effective in eliminating the administrative alerts and subsequent operational actions associated with filesystems running out of available capacity for additional client data. Without HSM, when a filesystem runs out of available capacity, a storage administrator must quickly employ one of the following manual data management techniques to allow client applications to remain operational:

Use a third-party archiving program to identify unwanted files and commit these to magnetic tape or optical disk. Archiving deletes all information about files from the fileserver's filesystem and applications cannot access these files without having them recovered from archive tapes or optical disks.

If the fileserver can continue to accommodate additional magnetic disk drives, these are added to the server and associated volume and filesystem are expanded. This is a time consuming process and may result in client application downtime.

If a fileserver has been expanded to its limits of disk storage capacity, the administrator must migrate some number of shares of data (a share being a directory or folder of storage capacity) to another server that has available capacity.

Contrasting this with HSM-based fileservers, as filesystems fill up, least recently used data is automatically migrated out to another storage medium like tape. Unlike archiving, HSM provides client applications with transparent continual access to their files, even when they've been migrated to magnetic tape. There is no need to add additional magnetic disk storage to a fileserver that supports HSM since storage is expanded by adding more magnetic tapes to the lower-level in the storage hierarchy. Finally, migrating shares from one server to another does not have to be performed specifically for reasons of balancing capacity across multiple fileservers.

In U.S. Pat. No. 5,537,585, Blickenstaff, et al. describe an HSM system that migrates least recently used data from a fileserver to a lower-cost back-end removable storage system. The HSM servers are monitored for filesystem capacity utilization, and when they fill up, least recently used files are identified and migrated out to back end storage.

U.S. Pat. No. 5,276,860 describes a system that employs both HSM and backup technology using removable storage media like optical disks and magnetic tape. HSM is used as a means of reducing the amount of data that had to be committed to backups since data that is staged out to an optical disk is considered backed-up. However a need remains for data protection systems that provide timely and cost-effective disaster recovery and/or data migration.

SUMMARY OF THE INVENTION

The present invention is related to computer primary data storage systems and methods that provide comprehensive data protection. Embodiments of data protections systems according to the present invention work in reverse to U.S. Pat. No. 5,276,860 in that the systems regularly back up data and, when they must migrate data, they select files that have already been backed up as migration candidates. When a filesystem fills up, migration candidates are quickly and efficiently replaced by smaller stub files.

The present invention provides data management systems and methods where hierarchical storage management accelerates the time to complete disaster recovery operations that traditionally could take hours or days to complete. This recovery time factor is relevant since, while these operations are taking place, client applications cannot access their files.

Embodiments of the present invention provide data management scenarios where hierarchical storage management accelerates the time to complete operations that traditionally could take hours or days to complete. This recovery time factor is relevant since while these operations are taking place, client applications cannot access their files.

1. Moving one or more shares of data from one fileserver to another. Even though HSM based fileservers do not require that this be performed since their filesystems do not fill up, storage administrators perform this activity to spread the client application load across more fileservers.
2. Moving the entire contents of a NAS fileserver to another Fileserver. Administrators perform this service in the following situations:
Performance load balancing
Loss of a fileserver
Fileserver hardware and operating system upgrades
Site Disaster Recovery—loss of an entire site's worth of fileservers

BRIEF DESCRIPTION OF THE DRAWINGS

FIG. 1 is a diagram of a deployment of one embodiment of the invention across three data centers.

FIG. 2 illustrates how one embodiment of a protection policy creates a relationship between a fileserver share and associated repositories such as those shown in FIG. 1.

FIG. 3 shows one embodiment of a first step in recovering from the loss of a fileserver or an entire site.

FIG. 4 shows one embodiment of a second step in recovering from the loss of a fileserver or an entire site.

FIG. 5 shows one embodiment of a first step in migrating shares of data from one fileserver to another.

FIG. 6 shows one embodiment of a second step in migrating shares of data from one fileserver to another.

FIG. 7 shows one embodiment of a user interface that a storage administrator uses to initiate a migration of one or more shares from the selected fileserver to another fileserver.

FIG. 8 shows a screenshot of one embodiment of a user interface for the protection policy of FIG. 2.

FIG. 9 shows one embodiment of the apparatus and the software components that are used to protect new client data to a local repository node.

FIG. 10 shows one embodiment of the apparatus that replicates data among repositories.

FIG. 11 is a flow chart illustrating one embodiment of a two stage share migration or server recovery operation.

FIG. 12 is a flow chart illustrating one embodiment of an HSM stage out process.

FIG. 13 is a schematic block diagram of one embodiment of the recovery service of FIG. 9.

DETAILED DESCRIPTION OF THE DRAWINGS

FIG. 1 is a diagram that illustrates one embodiment of an integrated primary data storage and data protection system according to the invention. Fileservers 4 provide primary data storage capacity to client systems 5 via standard network attached storage (NAS) protocols like network file system (NFS), common Internet file system (CIFS) and file transfer protocol (FTP). The apparatus is designed to operate among two or more data centers 1. Two or more repositories 3 deployed across these data centers provide storage capacity and data management processing capability to deliver complete data protection for their associated fileserver primary storage systems. The apparatus leverages metropolitan or wide area internet protocol (IP) networking 2 to allow repositories to send and receive data for replication. By having data replicated to a local and at least one remote repository from the originating fileserver, these repositories act as a replacement for traditional on-site and off-site tape storage systems and tape vaulting services. According to one embodiment, in the event of a site disaster, all fileservers that were lost are recovered by deploying new fileservers at a surviving site and recreating the content of the failed fileservers from the content in the surviving repositories.

FIG. 2 is a diagram that illustrates an association between a fileserver 6 and two repositories 8 that are deployed across data centers. All primary data storage activity occurs between one or more clients and one or more fileservers through a NAS share 7. A fileserver is typically configured to have tens of shares. These shares allow the primary storage capacity of the fileserver to be shared and securely partitioned among multiple client systems.

A share is created on a fileserver as a directory or folder of storage capacity. The contents of this shared directory or folder is accessible by multiple clients across a local area network. For example, in the Microsoft Windows environment, CIFS shares appear as storage folders within LAN-connected servers under "My Network Places" of the Windows Explorer user interface. For UNIX environments, shares are accessed through mount points which define the actual server and folder where data is stored as well as a virtual folder that appears to be part of the local client system's filesystem.

Because one embodiment of a system according to the invention is both a primary data storage system and a data protection system, a storage administrator defines how the system protects each share of a fileserver across two or more repositories through the creation of a unique protection policy 9 for that share. In one embodiment, this protection policy defines which repositories the system will use to protect each share's data. In one embodiment it also defines how often data protection will occur, how many replicas will be maintained within each repository based on the criticality of a share's data, and how updates and modifications to share data should be maintained. On a periodic basis, each fileserver examines the protection policy for its shares and when appropriate, the fileserver captures all recent changes to a share's files and stores/protects these files within two or more repositories.

FIG. 3 shows that client data is protected among multiple repositories, as well as the metadata associated with that client data 10, 11, respectively. By maintaining this metadata in replicated repositories, fileservers and/or their shares may be easily migrated to another fileserver. In one embodiment metadata for a file includes the following information:

The fileserver name where the file was created
The size of the file
A list of all of the repository nodes that maintain a replica of this file
A computed MD5 content checksum of the file when it was first created or last modified.

Metadata files are maintained within repository nodes and cached on fileservers to assist in managing the protection of these files across multiple repository nodes.

HSM stub files, in contrast, are typically only contained on the fileserver and are used to assist the fileserver's HSM software in transparently providing file access to client applications, regardless of the physical location of a file.

FIG. 4 displays server recovery. Fileserver Y 14 has its client data and metadata regularly protected within two repositories. When fileserver Y becomes unavailable because of hardware failure or the loss of a site, the redundantly replicated fileserver configuration and file metadata from the last backup period is applied to either a surviving fileserver or to a new fileserver, shown as Z 15. This server recovery action is initiated by a storage administrator.

The actions performed by a storage administrator using embodiments of this invention for server recovery are similar to the actions performed when shares of data must be migrated from one operational fileserver to another. Share migration is typically performed in order to improve client application performance by shifting the load created by clients for one or more shares on a heavily accessed fileserver to an underutilized or more powerful existing server, or to a new fileserver. Share migration may also be performed, for example, when client applications are physically relocated to different offices or data centers and expect continued high-performance LAN access to their shares of data instead of accessing the same fileserver across a metropolitan or wide-area network. In this case, all share data from the previous facility can be quickly migrated to one or more servers at the new location.

FIG. 5 and FIG. 6 represent a time-sequenced pair of diagrams that illustrate the activities that occur when one or more fileserver shares are migrated from one fileserver to another. In this scenario, there has been no failure of fileserver Y, but the storage administrator wishes to migrate $Y_a$ and $Y_b$ to a new server called fileserver Z.

In FIG. 5, fileserver Y 16 has three shares called $Y_a$, $Y_b$ and $Y_c$. In one embodiment, all of the metadata associated with these three shares is replicated to two repositories as Y Metadata 17, 18 in the diagram.

In FIG. 6, a storage administrator has decided to migrate shares $Y_a$ and $Y_b$ from fileserver Y to fileserver Z 19. The following procedure is performed by the system administrator:

- Notify clients that there will be a period where their files will not be accessible during the migration.
- Initiate a share migration using the invention's management application interface to initiate the migration of shares $Y_a$ and $Y_b$ from fileserver Y to fileserver Z 19.
- All of the metadata associated with these two shares is replicated to two repositories as Z Metadata 20, 21 in the diagram.
- When the management interface reports that a migration is completed, client applications are re-associated with their files now located on fileserver Z. This share migration occurs quickly relative to conventional migration because only the much smaller 4 KB stub files need to be present on the fileserver to allow clients to regain access to their files.
- As client requests are made for data that is only represented as a stub file on the fileserver, the stub file is replaced with the entire contents of a file transparently through a "stage-in" process. In other words, staging-in a file involves replacing a stub file with the entire contents of the file. Since data to be staged-in is sent from fast networked repository node magnetic disk drives instead of traditional magnetic tapes or optical disks, the time to stage-in is typically reduced from tens of seconds or minutes to under a second for moderately sized files (10-50 MB).
- As a background task, the Recovery service 45 shown in FIG. 9 also repopulates fileserver Z with all of the files that were present in their full form on fileserver Y before the share migration was requested.
- Finally, the share or shares that were migrated from fileserver Y to fileserver Z are deleted from fileserver Y since they are no longer referenced by client applications from that server.

FIG. 7 displays one embodiment of a user interface that is used to initiate a file migration of a share from one fileserver to another. The illustrated screenshot displays two shares 22, TEST1 and test2, existing on a single fileserver, GPNEON 23. In this example, a storage administrator recently chose to migrate the share called TEST1 from the GPNEON fileserver to the GPXEON 24 fileserver. The status column of the user interface shows that the TEST1 share is currently in a migrate state 25. The status column of the user interface also shows that the share test2 on the GPNEON fileserver is online 26 and available for migrating to another fileserver if desired.

Figure 8:
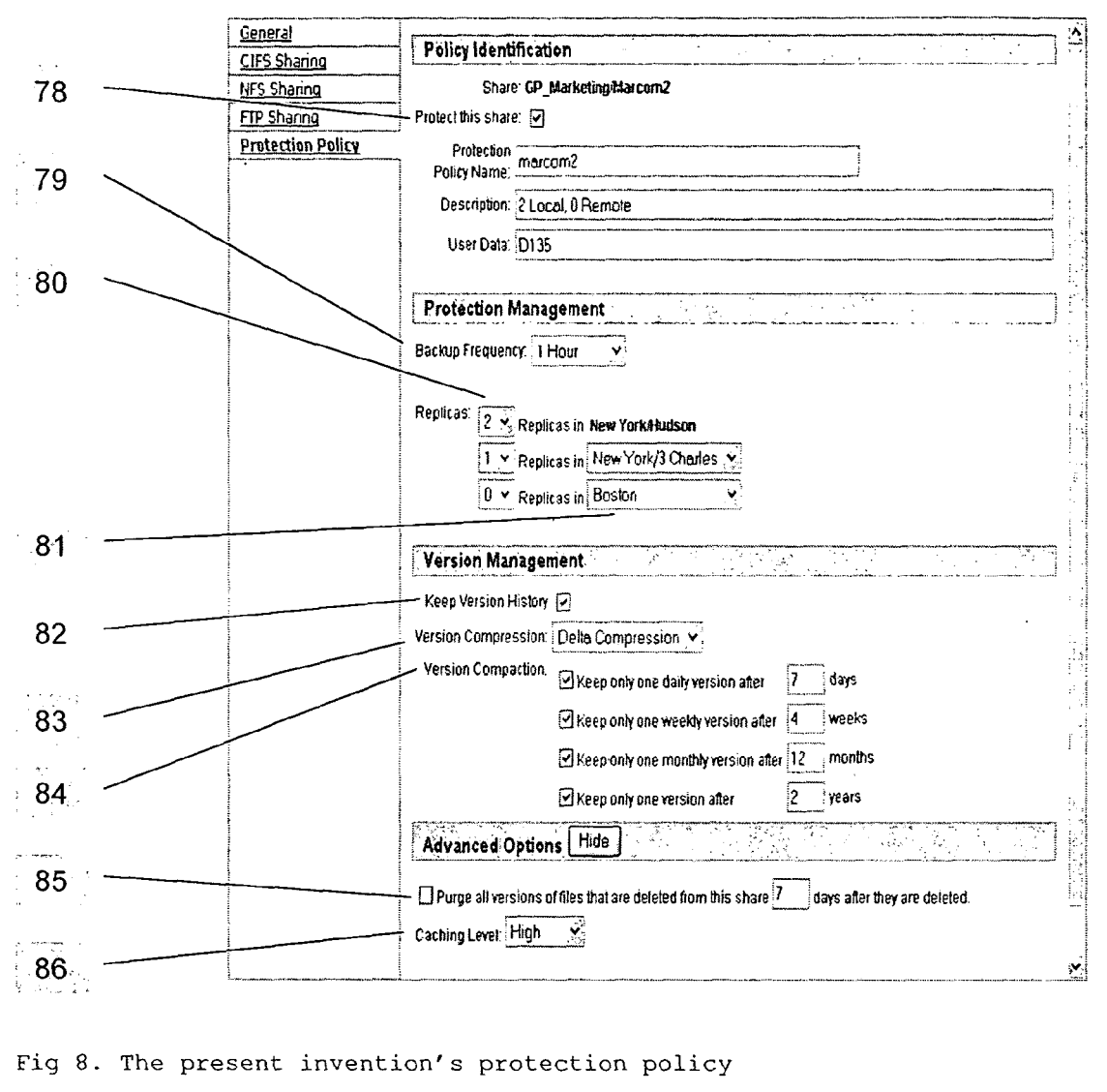

FIG. 8 is a screenshot of one embodiment of the present invention's protection policy. There is a unique protection policy defined by a storage administrator for each share of each fileserver. Before arriving at the protection policy screen, a storage administrator creates a share and allows it to be accessible by CIFS and/or NFS and/or FTP. Once a new share is created, the protection policy screen is displayed. Within this screen, the storage administrator can specify the following data protection parameters:

- Protect this share 78—this checkbox is normally checked indicating the data in this share should be protected by repositories. There are certain client applications that might choose to use a fileserver for primary storage, yet continue to protect data using third party backup or archiving products. If this checkbox is left unchecked, all other options in the protection policy user interface are disabled. One embodiment of the system can only perform share migration and server recovery with shares that are protected.
- Protection Management—Backup Frequency 79—this option determines how often a fileserver share's data will be protected in the local and remote repositories. In one embodiment, the backup frequency intervals can be selected from a list of time intervals which include: 15 minutes, 30 minutes, 1 hour, 2 hours, 3 hours, 4 hours, 6 hours, 8 hours, 12 hours and 24 hours. All backup frequency intervals are anchored to 12:00 midnight of each fileserver's local time-zone. Setting the backup frequency to 24 hours is similar to performing traditional daily incremental backups. Setting this interval to 15 minutes allows versions of files that change often during the day to be protected on 15 minute intervals. Only files that have changed since the last backup occurred are saved in repositories.
- Protection Management—Number of replicas per repository. This feature allows a storage administrator to determine how many replicas 80 of data to create within each repository 81 when a share is protected. In one embodiment, there must be at least one replica stored in a repository that is local to the share's fileserver. It's possible to maintain multiple replicas within a single repository. In this case, replicas are maintained on different repository nodes of a repository to ensure continued access to a replica in the event of a single repository node failure or network failure. The location and number of replicas can be changed over time. To increase data availability for data that is increasing in criticality, more replicas per repository and additional repositories may be specified. For data that is decreasing in importance, fewer replicas may be maintained in the repositories, which makes more storage capacity available to other shares that are also using those repositories.
- Version Management—Keep Version History 82—this checkbox should be checked for shares whose file content is regularly being updated. When checked, the specified repositories will maintain a version chain of all changes that were identified at each backup frequency interval. For shares of data that have unchanging file content, this checkbox can be unchecked.

Version Management—Version Compression 83—the three compression options are to not compress, to reverse delta compress or to apply simple file compression to a share's files. Delta compression typically provides the highest compression ratio for shares whose files are regularly being modified.

Version Management—Version Compaction 84—compaction provides a means of removing versions of files based on each version's age. For example, the version compaction option for a file share may be configured to maintain only one monthly version of a file after a year, one weekly version of a file that's older than 6 months and one daily version of a file that's older than 1 month. All "extra" versions can be automatically purged from repositories, which in turn, makes more storage capacity available for new versions of files as well as new files.

Advanced Options—Purge on Delete 85—this option, when checked will cause files that are deleted from a fileserver's share to also be purged from repositories as well. This feature is effective with applications like third party backup, where some of the replicas and versions that are being retained by repositories are no longer needed to satisfy that application's recovery window and may be purged from all repositories.

Advanced Options—Caching Level 86—this allows the storage administrator to control the level at which the Mirror service 33 (FIG. 9) looks for candidate files to be staged out to repository nodes. It represents the approximate percentage of client data that will be cached on a fileserver. Normally, this option is set to "Optimize for Read" to allow the maximum number of most-recently accessed files to be available to client applications at the highest performance levels. All least recently used data is maintained in two or more repositories. Conversely, the caching level can be set to "Optimize for Write", which reduces the amount of cached data available to clients but provides consistently high levels of available storage capacity for write operations on the fileserver, i.e., for receiving data. One uses this mode/setting for applications such as third party backup applications. In this mode, by aggressively moving data off of a fileserver into repositories, the application sees the fileserver as a storage device with virtually infinite capacity.

FIG. 9 and FIG. 10 illustrate modules used to protect data files created by a client using a local repository and a remote repository. FIG. 9 displays one embodiment of the apparatus and software modules of the present invention that are associated with protecting client files to a local repository. The apparatus includes a fileserver 27 and a single local repository node 28. Clients access a fileserver via the client IP-based (Internet Protocol) network 29 and communicate with the fileserver using NFS, CIFS or FTP protocols. All fileservers and all repository nodes are interconnected by an internal IP-based (Internet Protocol) network 30. Current client files reside on a fileserver's filesystem 32.

According to embodiments of the invention, all input/output activity initiated by client file requests is intercepted by the filter driver 31. The fileserver software maintains a list of all modified or created files since this last snapshot occurred. In one embodiment, snapshot intervals can range from 15 minutes to 24 hours, based on the backup frequency 19 of the protection policy. On the schedule of the backup frequency, the mirror service 33 prepares all modified files in a share to be put into the repositories 8 (shown in FIG. 2) that are specified in that share's protection policy. The protection policies are stored and replicated across multiple repositories, and they are cached and regularly updated within each fileserver in the protection policy cache 34. For example, if a share's protection policy has its backup frequency set to one hour, on the transition to the next hour, the mirror service 33 initiates a backup of all changed files in the last hour to a local repository 28. For all new files, any repository node of the local repository can be used to hold a replica of a file. For files that have been modified, the mirror service directs new versions of the existing file to the same repository node as prior versions of that file. The mirror service queries the location cache 36 to determine which repository node should receive an updated version of an existing file. This location cache is updated regularly by the location manager 35 when the fileserver writes files to specific repository nodes. Once the location manager identifies all destination repository nodes for each file of a share for the latest collection of updated or created files, the fileserver communicates to each local repository via a fileserver API 37 and a repository node API 38. Each repository node's data mover 39 supervises the replication of files from the fileserver to its repository node. The fileserver file transfer module 40 transfers files from the fileserver filesystem to each repository node's file transfer 41 module. Once the files are replicated to specific disk drives within a repository node, its location manager 42 updates its location cache 43 with repository node location information. For all files that arrive at a repository node that are modified versions of existing files, the share's protection policy 44 version management settings are reviewed to determine whether new versions should be compressed and whether older versions should be maintained.

In FIG. 9, the recovery service 45 on the fileserver is responsible for managing the movement of one or more shares of data either from an existing fileserver (migration) or to a new server when an existing fileserver has failed or was lost in a site disaster.

At this point in the description, client data is only replicated to a local repository. FIG. 10 illustrates one embodiment of modules that implement a process that protects data to one or more remote repositories to completely protect client data from site disaster. FIG. 10 displays a local repository node 46 that, from the actions described in FIG. 9, holds the first replica of data. FIG. 10 also shows a remote repository node 47. These are connected to each other across a metropolitan or wide-area network 48. In one embodiment, all data that is transferred between local and remote repositories may be secured by virtual private networking (VPN) 49 encryption. The local repository node's replication service 50 is responsible for reviewing the protection policy 51 for all files that were just created as part of the recent fileserver backup. Each repository node acts as a peer of other repository nodes. Based on the protection policy each repository node manages the movement of files among all repository nodes using repository node APIs 52, 53, data movers 54, and file transfer modules 55, 56. Once the data is replicated to remote repositories, the location manager 57 of each repository node updates the location cache 58 to track where files are maintained within that repository node. The version service 59 of the remote repository node manages file version compression, and compaction according to the protection policy.

FIG. 11 displays the method by which a share migration or fileserver recovery operation is performed. A storage administrator initiates 60 the migration/recovery activity through the secure web-based user interface displayed in FIG. 7. From this interface, the storage administrator selects 61 the share or shares that should be included in the share migration or fileserver recovery, and also names the destination fileserver to receive the share(s). This action initiates a share migration or recovery service job on the destination fileserver.

The destination fileserver's recovery service collects 62 the share's metadata from one of the two or more repositories that may have a replicated copy of that metadata. In addition to share metadata, stub files also populate 63 the destination fileserver. Stub files are files that appear to a user as a normal file but instead include a pointer to the actual location of the file in question.

During the load of the relevant stub files, the recovery/migration service updates 64 the fileserver's location cache to maintain a list of the repository nodes that are associated with each recovered file. Once these stub files are in place, clients can be connected to the new fileserver to allow them to immediately view all of their files. To the clients, the recovery operation appears to be complete, but accesses to each file will be slightly slower since a file requested by a client initiates a transfer from a repository node back into the fileserver.

FIG. 11 also shows the second phase of the two phases of migration/recovery. In the second phase, clients have access 65 to their files. The recovery service responds to client requests for files as a high priority task and replaces the stub file. e.g., a 4 KB stub file, with the full content of each file requested. At a lower priority, the recovery service begins/continues loading the files that were most-recently accessed on the previous fileserver back into the destination fileserver. This process expedites client requests for data while the migration/recovery process proceeds.

More specifically, the process determines 66 if all of the files that were most recently accessed on the prior fileserver have been transferred in full to the destination fileserver. If so, the process determines 69 that the migration/recovery process is complete. If not, the process determines 67 if a client file request for a yet-to-be-transferred file has been received. If so, the process replaces 70 the stub file associated with the requested file with the full content of the file. If not, the process transfer 68 in a file that have yet to be transferred and returns to step 66, i.e., determining whether all specified files have been transferred.

FIG. 13 shows one embodiment of the recovery service 45 of FIG. 9. With reference to FIG. 13, a receiving component 94 receives metadata and stub files associated with the set of files at a destination fileserver. A location updating component 95, in communication with the receiving component, maintains a list of repository nodes that are associated with each file in the set of files. In addition, a stub file replacement component 96, in communication with the receiving component, replaces the stub files with the full content of the file associated with the stub file as described above.

FIG. 12 illustrates the flowchart that describes how fileserver files are migrated out to repositories. The Mirror service 33 (FIG. 9) constantly monitors the consumption of space in the fileserver's filesystem. It compares the current filesystem consumption against the storage administrator's selection for caching level 86 in the protection policy (FIG. 8). The three caching levels available to storage administrators in the protection policy are "Optimize for Read", "Optimize for Write" and "Balanced". The translation from these three settings to actual percentages of filesystem utilization are maintained in configurable HSM XML tables, but in one embodiment by default, optimize for read attempts to maintain about 70% of the total filesystem for caching client application files, balanced attempts to maintain about 50%, and optimize for write attempts to maintain about 30% of the data in the filesystem. Optimize for write, more importantly, tries to keep 70% of the fileserver's space available for incoming data for client applications that mostly write data and do not access this data regularly.

Based on the comparison 90 of filesystem utilization and the caching level of the protection policy, the mirror service either continues to monitor filesystem utilization or it initiates a "stage out". The first step in preparing for a stage-out is to identify files 91 that make good candidates for staging. In one embodiment, since the stub file that replaces the real file consumes 4 KB, all files less than or equal to 4 KB are not considered as candidates for stage-out. Larger files are preferred for stage-out as are files that have not been accessed by client applications recently. Finally, the preferred candidate file is one that has already been backed up into the repository by the periodic backups that take place in the present invention. Once the list of candidate files is made, a candidate file is staged out 92 according to the list. Once, the candidate file is staged out, the system determines 93 if the HSM caching threshold is still exceeded. If not, the stage-out of more files takes place.

Since stub files may be replacing very large files, filesystem space quickly frees up to bring the filesystem utilization back under the threshold. Traditional HSM systems must quickly stage-out entire files out to magnetic tape or optical disk when an HSM filesystem fills up. But embodiments of the present invention select candidates that have already been protected in two repositories as part of its ongoing backup. So when it needs to stage a file out, it only needs to replace the full file on the fileserver with a stub file that points to the full version of the file stored during backups. This approach eliminates the time-consuming process of moving hundreds or thousands of files from the fileserver to the repository. This approach creates a system that can more quickly react to rapid changes in filesystem utilization. Once the filesystem consumption falls below the HSM caching level, the mirror service returns to monitoring the filesystem utilization. In this way, the Mirror service continues to stage data to a value below the threshold, as defined in the configurable HSM XML table.

The present invention makes data available to clients after a migration/recovery operation many times faster than traditional data storage and protection systems. The present invention's use of hierarchical storage management allows it to present data to clients as soon as the file metadata and the 4 KB HSM stub files are loaded onto the destination fileserver. Since a stub file that has recently either been migrated or recovered to a different fileserver acts as a proxy for the complete file maintained in one or more repositories, the migration/recovery activity appears to be completed from the client application perspective. Also, in one embodiment, only the files that are most-recently used, as defined by a filesystem full threshold, must be reloaded into the new fileserver as a background task. With traditional share migration or server recovery, all files would have to be reloaded back onto a server which could extend the recovery or migration time significantly.

Thus, one embodiment of the present invention applies hierarchical storage management (HSM) in order to accelerate the migration of files from one fileserver to another and to reduce the time necessary for clients to regain access to their data after the complete loss of a fileserver.

One embodiment of the present invention is an integrated data storage and data protection system that is physically deployed across two or more data centers. One deployment of an apparatus according to the invention within each data center includes one or more fileservers and one or more repositories. The fileservers provide primary disk storage capacity to IP-networked clients via NFS, CIFS or FTP protocols. Each repository is a virtualized pool of disk storage capacity that:

- Acts as a second level of data storage to a fileserver's primary level of data storage as part of the hierarchical storage management system.
- Acts as a replacement for magnetic tape backup systems by regularly storing and maintaining versions of new and modified files.
- Acts as a replacement for offsite media storage and offsite disaster recovery systems by replicating all data that is stored in a repository that's local to a fileserver to one or more offsite repositories.
- Acts as a stable replicated storage environment for replicating all fileserver configuration and file metadata information.

A protection policy defines how client data within the fileserver's primary disk storage system will be protected among the collection of repositories located in multiple data centers. Each share's protection policy specifies, among other things, the number of replicas to maintain within multiple repositories. In one embodiment, replicas reside in at least two repositories. These repositories should be located a disaster-safe distance from each other.

The backup frequency defines the periodic time interval at which the fileserver protects new and updated client data into the specified repositories. As part of periodic backup, each fileserver's configuration and file metadata information is also protected in multiple repositories. The configuration and metadata information that is stored in repositories is used for recovering from the loss of one or more fileservers and for migrating shares of data among a collection of fileservers.

What is claimed is:

1. A method for storing data, the method comprising:
   providing a fileserver having:
      a file system configured to store client files;
      a policy component configured to store a protection policy associated with a set of files;
      a mirror service in communication with the policy component, the mirror service configured to prepare modified and created files in a set of files to be written to a repository as specified in the protection policy associated with the set of files;
      a fileserver API coupled to the mirror service and configured to communicate with a repository;
      a fileserver file transfer module in communication with the file system and configured to transfer files for the file system to at least one repository or transfer files for the file system from at least one repository; and,
      a location updating component configured to maintain a list of repository nodes that contain a replica of each file in the set of files and a list of files in the set of files stored at the fileserver;
   said fileserver initiates recovery of files in the set of files on the fileserver, wherein based on the list of files and the list of repository nodes stored at said fileserver, a replica of a file in the list of files is recovered from a repository node in the list of repository nodes;
   wherein using a stub file in the set of stub files, said fileserver allows access to a full content of a file associated with the stub file by receiving a client request for a specified file in the set of files, replacing the stub file with the full content of the specified file associated with the stub file, and replacing remaining stub files in the set of stub files with respective full contents of remaining files in the set of files while replacing the stub file with the full content of the specified file;
   determining a caching level for said fileserver; and
   recursively, determining a utilization of the fileserver;
   comparing the caching level against the utilization; and
   creating a file migration candidate list when the utilization exceeds the caching level;
   staging out one candidate file;
   replacing the candidate file with a stub file; and
   determining whether the utilization of the fileserver still exceeds the caching level, wherein said determining if the utilization of the fileserver still exceeds the caching level further comprises staging out another candidate file on the candidate list and again determining if the utilization of the fileserver exceeds the caching level.

2. The method of claim 1 wherein a metadata is received at the fileserver from a repository node in the list of repository nodes.

3. The method of claim 2 further comprising:
   selecting the fileserver for receiving the metadata and the set of stub files.

4. The method of claim 1 further comprising:
   selecting a share of data for receiving at said fileserver.

5. The method of claim 3 wherein the metadata is associated with a file in the set of files and includes
   a fileserver name where the file was created;
   a size of the file;
   the list of all repository nodes that maintain a replica of the file; and,
   a content checksum of the file when the file was first created or last modified.

6. The method of claim 1 wherein the set of files is the set of files that have been accessed during a specified period; and
   wherein the replacing each stub file step further comprises
   recursively replacing the stub files associated with the files that were accessed within the specified period until all stub files associated with the set of files have been replaced.

7. The method of claim 6 wherein the specified period is a most-recent period.

8. The method according to claim 6,
   wherein a recovery service is configured to recursively replace the stub files associated with the files that were accessed within the specified period until all stub files associated with the set of files have been replaced.

9. The method of claim 1 wherein said replacing the stub file for the specified file is a higher priority task than replacing the stub files for non-requested files.

10. A system for storing data, the system comprising:
    a fileserver having:
       fileserver hardware;
       a file system configured to store client files;
       a policy component configured to store a protection policy associated with a set of files;
       a mirror service in communication with the policy component, the mirror service configured to prepare modified and created files in a set of files to be written to a repository as specified in the protection policy associated with the set of files;
       a fileserver API coupled to the mirror service and configured to communicate with a repository;
       a fileserver file transfer module in communication with the file system and configured to transfer files for the file system to at least one repository or transfer files for the file system from at least one repository; and, a location updating component configured to maintain a list of repository nodes that contain a replica of each file in the set of files and a list of files in the set of files stored at the fileserver;

said fileserver initiates recovery of files in the set of files on the fileserver, wherein based on the list of files and the list of repository nodes stored at said fileserver, a replica of a file in the list of files is recovered from a repository node in the list of repository nodes;

wherein using a stub file in the set of stub files, said fileserver allows access to a full content of a file associated with the stub file by receiving a client request for a specified file in the set of files, replacing the stub file with the full content of the specified file associated with the stub file, and replacing remaining stub files in the set of stub files with respective full contents of remaining files in the set of files while replacing the stub file with the full content of the specified file;

said mirror service is configured to:
- determine a caching level for said fileserver; and recursively, determine a utilization of the fileserver; compare the caching level against the utilization; and create a file migration candidate list when the utilization exceeds the caching level;
- stage out one candidate file;
- replace the candidate file with a stub file; and
- determine whether the utilization of the fileserver still exceeds the caching level, wherein said determining whether the utilization of the fileserver still exceeds the caching level further comprises staging out another candidate file on the candidate list and again determining if the utilization of the fileserver exceeds the caching level.

11. The system of claim 10 further comprising
a filter driver operative to intercept input/output activity initiated by client file requests and to maintain a list of modified and created files since a prior backup.

12. The system of claim 11 further comprising:
a location cache in communication with the mirror service and configured to indicate which repository should receive an updated version of an existing file; and
a location manager coupled to the location cache and configured to update the location cache when the system writes a new file to a specific repository node.

13. The system of claim 10 further comprising
a local repository having:
  a local repository node API configured to communicate with the fileserver API;
  a local repository file transfer module in communication with the fileserver file transfer module and configured to transfer files to the fileserver file transfer module; and
  a data mover in communication with the local repository node API and configured to supervise the replication of files from the local repository to the fileserver.

14. The system of claim 13 wherein the fileserver API is configured to communicate with a network and wherein the system further comprises:
a remote repository having:
  a remote repository node API configured to communicate with the network;
  a remote repository file transfer module in communication with the local file transfer module and configured to transfer files to the fileserver file transfer module; and
  a data mover in communication with the remote repository node API and configured to supervise the replication of files from the remote repository to the fileserver.

15. The system according to claim 10 wherein the fileserver is configured to receives a metadata from a repository node in the list of repository nodes.

16. The system according to claim 15, wherein the metadata is associated with a file in the set of files and includes
a fileserver name where the file was created;
a size of the file;
the list of all repository nodes that maintain a replica of the file; and,
a content checksum of the file when the file was first created or last modified.

17. The system according to claim 10 wherein the set of files is the set of files that have been accessed during a specified period; and
wherein the recovery service is further configured to recursively replace the stub files associated with the files that were accessed within the specified period until all stub files associated with the set of files have been replaced.

18. The system according to claim 17, wherein the specified period is a most-recent period.

19. The system according to claim 10, wherein the set of files in the set of files that has been accessed during a specified period; and
wherein a recovery service is configured to recursively replace the stub files associated with the files that were accessed within the specified period until all stub files associated with the set of files have been replaced.

* * * * *